United States Patent
Peisa et al.

(10) Patent No.: US 11,659,614 B2
(45) Date of Patent: May 23, 2023

(54) METHODS AND APPARATUS FOR REQUESTING SYSTEM INFORMATION IN A WIRELESS COMMUNICATION NETWORK

(71) Applicant: Telefonaktiebolaget LM Ericsson (publ), Stockholm (SE)

(72) Inventors: Janne Peisa, Espoo (FI); Jens Bergqvist, Linköping (SE); Johan Rune, Lidingö (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 157 days.

(21) Appl. No.: 16/068,003

(22) PCT Filed: May 2, 2018

(86) PCT No.: PCT/SE2018/050448
§ 371 (c)(1),
(2) Date: Jul. 3, 2018

(87) PCT Pub. No.: WO2018/203810
PCT Pub. Date: Nov. 8, 2018

(65) Prior Publication Data
US 2020/0113011 A1    Apr. 9, 2020

Related U.S. Application Data

(60) Provisional application No. 62/502,037, filed on May 5, 2017.

(51) Int. Cl.
*H04W 76/27* (2018.01)
*H04L 5/00* (2006.01)
(Continued)

(52) U.S. Cl.
CPC .......... *H04W 76/27* (2018.02); *H04L 5/0055* (2013.01); *H04W 72/04* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 9,491,611 B2* | 11/2016 | Zhu | ............ H04W 8/06 |
| 2005/0030919 A1* | 2/2005 | Lucidarme | ........ H04B 7/2681 |
| | | | 370/328 |

(Continued)

FOREIGN PATENT DOCUMENTS

| CN | 104641691 A | 5/2015 |
|---|---|---|
| CN | 105993192 A | 10/2016 |
| GB | 2557889 A | 7/2018 |

OTHER PUBLICATIONS

Unknown, Author, "Delivery of System Information", Qualcomm Incorporated, 3GPP TSG-RAN WG2 Meeting NR ad-hoc, R2-1700587, Spokane, USA, Jan. 17-19, 2017, 1-4.

(Continued)

Primary Examiner — Ernest G Tacsik
(74) Attorney, Agent, or Firm — Sage Patent Group

(57) ABSTRACT

Embodiments disclosed herein provide methods and apparatus for requesting system information in a wireless communications network. The method comprises in a user equipment for a wireless network receiving, from a base station of the wireless network, a first portion of system information comprising an indication of a second portion of system information which is available upon request; and transmitting, to the base station, a first request requesting that the second portion of system information be transmitted to the user equipment. The method further comprises responsive to a determination that the requested second (Continued)

portion of system information has not been received successfully by the user equipment, transmitting, to the base station, a second request for the second portion of system information.

24 Claims, 7 Drawing Sheets

(51) Int. Cl.
*H04W 72/04* (2023.01)
*H04W 74/08* (2009.01)

(56) References Cited

U.S. PATENT DOCUMENTS

| | | | | |
|---|---|---|---|---|
| 2011/0034199 | A1* | 2/2011 | Zhao | H04L 69/28 |
| | | | | 455/510 |
| 2015/0173089 | A1* | 6/2015 | Baghel | H04W 48/12 |
| | | | | 370/329 |
| 2015/0373609 | A1* | 12/2015 | Kim | H04W 36/04 |
| | | | | 370/332 |
| 2016/0234736 | A1* | 8/2016 | Kubota | H04L 12/18 |
| 2016/0295503 | A1* | 10/2016 | Bucknell | H04W 74/0833 |
| 2017/0251500 | A1* | 8/2017 | Agiwal | H04W 72/0413 |
| 2018/0035468 | A1* | 2/2018 | Ishii | H04W 72/0446 |
| 2018/0049159 | A1* | 2/2018 | Gu | H04W 48/14 |
| 2018/0077728 | A1* | 3/2018 | Shi | H04W 68/00 |
| 2018/0270866 | A1* | 9/2018 | Loehr | H04L 1/189 |
| 2019/0053131 | A1* | 2/2019 | Suzuki | H04W 8/24 |
| 2019/0159110 | A1* | 5/2019 | Takahashi | H04W 48/14 |
| 2020/0068477 | A1* | 2/2020 | Awada | H04W 48/08 |

OTHER PUBLICATIONS

Unknown, Author, "Discussion on other SI request", vivo, 3GPP TSG-RAN WG2 Meeting #97bis, R2-1702518, Spokane, USA, Apr. 3-7, 2017, 1-4.

Unknown, Author, "On Demand SI: Further Details of MSG1 Approach", Samsung, 3GPP TSG-RAN WG2 Meeting #98, R2-1704049, Hangzhou, China, May 15-19, 2017, 1-6.

Unknown, Author, "On Demand SI: Further Details of MSG3 Approach", Samsung, 3GPP TSG-RAN WG2 Meeting #98, R2-1704050, Hangzhou, China, May 15-19, 2017, 1-4.

Unknown, Author, "Procedure for Request and Acquisition of Other-SI", InterDigital Communications, 3GPP TSG-RAN WG2 Meeting #97bis, R2-1702877, Spokane, Washington, Apr. 3-7, 2017, 1-3.

Unknown, Author, "Remaining issues of On-demand SI", Ericsson, 3GPP TSG-RAN WG2 #98, R2-1704385, Hangzhou, P.R. of China, May 15-19, 2017, 1-7.

First Chinese Office Action for Chinese Patent Application No. CN 201880029932.5 dated Jul. 20, 2021, 11 pages (including English translation).

Samsung, 3GPP TSG-RAN WG2 Meeting # 97, R2-1700817 (Update of R2-1700011), "On Demand SI Request Transmission Mechanism", Athens, Greece, Feb. 13-17, 2017, 2 pages.

Guangdong OPPO Mobile Telecom, 3GPP TSG RAN WG1 Meeting 88, R1-1701940, "Discussion on the Request for the on Demand SI", Athens, Greece, Feb. 13-17, 2017, 2 pages.

Lin Mu et al., "Research on Random Access in LTE System Based on RACH Overload Control", School of Electronic Information Engineering, Tianjin University, China, 6 pages.

* cited by examiner

METHODS AND APPARATUS FOR REQUESTING SYSTEM INFORMATION IN A WIRELESS COMMUNICATION NETWORK

TECHNICAL FIELD

The present disclosure relates to methods and apparatus for requesting system information in a terminal device for a wireless network.

BACKGROUND

Efforts are on-going to develop and standardize communications networks and protocols intended to meet the requirements set out for the fifth generation (5G) of wireless systems, as defined by the Next Generation Mobile Networks Alliance. The new system (also known as "New Radio" or "NR") is being designed to support lean carrier operation, where only absolutely necessary information is transmitted, preferably in a dedicated manner to the UE. This aim has a large impact on the design of the system information mechanisms for NR, as system information until now has always been transmitted and broadcast to all UEs in a cell. Furthermore, system information and initial access design is not as easy to modify or enhance in later releases as features require primarily dedicated signaling.

In order to minimize the amount of system information broadcast, on-demand delivery of parts of the system information may be introduced.

FIG. 1 illustrates on-demand signaling for delivery of parts of the system information. For this on-demand delivery the system information (SI) may be divided into Minimum SI and Other SI. Minimum SI 101 is periodically broadcast from the Node B 102 and received by the user equipment (UE) 103. The Minimum SI 101 comprises basic information required for initial access to the network and information for acquiring any other SI broadcast periodically or provisioned on-demand, i.e. scheduling information. The Other SI 104 encompasses everything not broadcast in the Minimum SI 101 and may either be broadcast, or provisioned in a dedicated manner, either triggered by the network or upon request from the UE.

For UEs operating in a connected state (i.e. RRC_CONNECTED), dedicated radio resource control (RRC) signaling can be used for the request and delivery of the Other SI. The Other SI may be broadcast at a configurable periodicity and for a certain duration. It is a network decision whether the Other SI is broadcast or delivered through dedicated and UE specific RRC signaling.

Each cell on which the UE is allowed to camp broadcasts at least some contents of the Minimum SI, while there may be cells in the system on which the UE cannot camp and do not broadcast the Minimum SI.

For a cell/frequency that is considered for camping by the UE, the UE is not required to acquire the contents of the Minimum SI of that cell/frequency from another cell/frequency layer. This does not preclude the case that the UE applies stored SI from previously visited cell(s).

If the UE cannot determine the full contents of the Minimum SI of a cell (by receiving from that cell or from valid stored SI from previous cells), the UE may consider that cell as barred.

In addition, for an on demand request of broadcast SI transmission a UE operating in an idle or inactive mode the network may control whether the request for Other system information is transmitted by a random access preamble message or as part of a radio resource control connection message.

If the Physical Random Access Channel (PRACH) preamble and/or PRACH resource specific to each system information block (SIB) or set of SIBS which the UE needs to acquire is included in minimum SI, then the SI request may be indicated using the random access preamble.

If the PRACH preamble and/or PRACH resource specific to each SIB or set of SIBS which the UE needs to acquire is not included in the minimum SI, then the SI request may be included as part of a radio resource control connection message.

SUMMARY

The current solution does not cover any error cases when UE requests on-demand system information. For example, the request from the UE may not be received correctly by the network, or may collide with a request from another UE or the UE may not be able to receive the on-demand SIB transmission from the network. Based on currently agreed procedure, the UE may not be able to fully function in the system even for relatively minor errors in the on-demand system information procedure.

According to a first aspect of the disclosure there is provided a method of requesting system information in a terminal device for a wireless network. The method comprises receiving, from a network node of the wireless network, a first portion of system information comprising an indication of a second portion of system information which is available upon request. The method also comprises transmitting, to the network node, a first request requesting that the second portion of system information be transmitted to the terminal device; and responsive to a determination that the requested second portion of system information has not been received successfully by the terminal device, transmitting, to the network node, a second request for the second portion of system information.

According to another aspect of the disclosure there is provided a terminal device for a wireless network, the terminal device configured to carry out the method as described above.

According to another aspect of the disclosure there is provided a terminal device for requesting system information. The terminal device comprises: processing circuitry and a machine-readable medium storing instructions which, when executed by the processing circuitry, cause the terminal device to: receive, from a network node of the wireless network, a first portion of system information comprising an indication of a second portion of system information which is available upon request; transmit, to the network node, a first request requesting that the second portion of system information be transmitted to the terminal device; and responsive to a determination that the requested second portion of system information has not been received successfully by the terminal device, transmit, to the network node, a second request for the second portion of system information.

According to another aspect of the present disclosure there is provided a terminal device for a wireless network, for requesting system information. The terminal device comprises: a first module configured to receive, from a network node of the wireless network, a first portion of system information comprising an indication of a second portion of system information which is available upon request; a second module configured to transmit, to the network node, a first request requesting that the second portion of system information be transmitted to the terminal device; and a third module configured to, responsive to a determination that the requested second portion of system information has not been received successfully by the terminal device, transmit, to the network node, a second request for the second portion of system information.

The methods and apparatus disclosed herein allow efficient recovery from minor errors in the acquisition of system information, and avoids UE not functioning correctly due to incomplete system information.

Note that the discussion below focuses on a technical solution for LTE and those networks intended to meet the requirements set out for the fifth generation (5G) of wireless systems, as defined by the Next Generation Mobile Networks Alliance. However, those skilled in the art will appreciate that it is also possible to apply the methods and apparatus described herein to other networks and access technologies. In other networks, nodes and interfaces may have different names.

BRIEF DESCRIPTION OF THE DRAWINGS

For a better understanding of the present disclosure, and to show how it may be put into effect, reference will now be made, by way of example, to the accompanying drawings, in which.

DESCRIPTION

Figure 1:
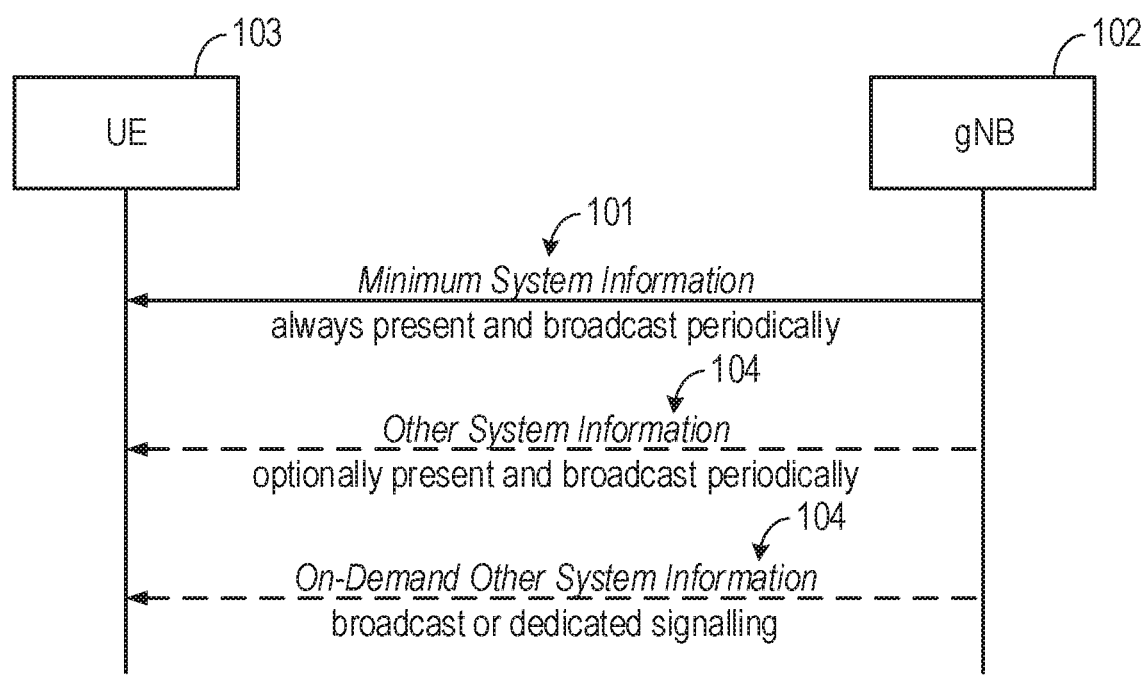
FIG. 1 illustrates on-demand signaling for delivery of parts of the system information.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry.

Thus, for example, it will be appreciated that "receiving" and "transmitting" steps performed by a wireless terminal or a radio base station are performed, e.g., by a processing circuit, using receiver circuitry and transmitter circuitry, respectively. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for a wireless terminal device, or user equipment (UE), it should be understood by the skilled in the art that "UE" is a non-limiting term comprising any mobile or wireless device, terminal or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device", "terminal device" and "wireless terminal device" may be used interchangeably in the following description, and it will be appreciated that such a device does not necessarily have to be 'mobile' in the sense that it is carried by a user. Examples of UE are target device, device to device (D2D) UE, machine type UE or UE capable of machine to machine (M2M) communication, PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc.

In some embodiments a more general term "network node" is used and it can correspond to any type of radio access node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc. Moreover, where the following description refers to steps taken in or by a network node or a radio access node, this also includes the possibility that some or all of the processing and/or decision making steps may be performed in a device that is physically separate from the radio antenna of the node, but is logically connected thereto. Thus, where processing and/or decision making is carried out "in the cloud", the relevant processing device is considered to be part of the node for these purposes.

The embodiments are described for LTE or LTE based systems such as machine-type communication (MTC), evolved MTC (eMTC), NB-IoT etc. As an example MTC UE, eMTC UE and NB-IoT UE also called UE category 0, UE category M1 and UE category NB1. However, the embodiments are applicable to any RAT or multi-RAT systems, where the UE receives and/or transmit signals (e.g. data) e.g. LTE FDD/TDD, WCDMA/HSPA, GSM/GERAN, WLAN, CDMA2000, 5G, NR, etc. It is recalled that 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term is specified in 5G.

Figure 2:
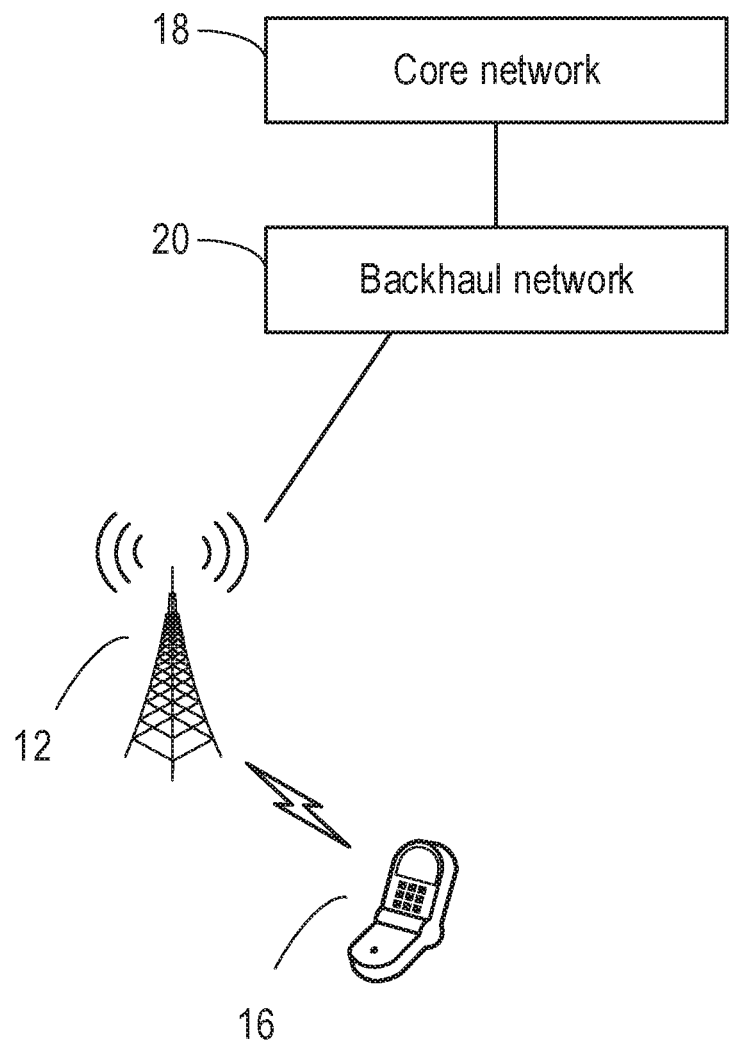
FIG. 2 shows a network according to embodiments of the disclosure.

FIG. 2 illustrates a network 10 that may be utilized to explain the principles of embodiments of the present disclosure. The network 10 comprises a network node 12 which is connected, via a backhaul network 20, to a core network 18. FIG. 1 also shows a terminal device (or UE, wireless terminal, etc) 16 that is in wireless communication with a network node 12. Messages transmitted by the terminal device 16 to the network node 12 are said to be transmitted in the "uplink", while messages transmitted by the network node 12 to the terminal device 16 are said to be transmitted in the "downlink".

Although the terminal device 16 is illustrated as a mobile phone, or smartphone, it will be understood by those skilled in the art that the terminal device may be any device that is configured for communication with the wireless communication network 10.

The network node 12 may be of a type referred to as e.g. radio access nodes, base stations, NodeBs, evolved NodeBs (eNB, or eNodeB), gNodeBs, base transceiver stations, Access Point Base Stations, base station routers, Radio Base Stations (RBSs), macro base stations, micro base stations, pica base stations, femto base stations, Home eNodeBs, relays and/or repeaters, beacon devices or any other network node configured for communication with wireless devices over a wireless interface, depending e.g. on the radio access technology and terminology used.

The present disclosure provides methods and apparatus for requesting system information in a terminal device for a wireless network. In particular, the present disclosure addresses issues with errors that occur when such requests are made, and methods for dealing with those errors when they occur.

The present disclosure therefore provides a terminal device that is able to detect a problem in the on-demand system information request procedure and to apply a series of recovery steps, such as trying to receive the on-demand system information one or more times and/or retransmitting the request one or more times. The proposed solution therefore allows efficient recovery from minor errors in the procedure, and avoids problems caused by a terminal device not functioning correctly due to incomplete system information.

Figure 3:
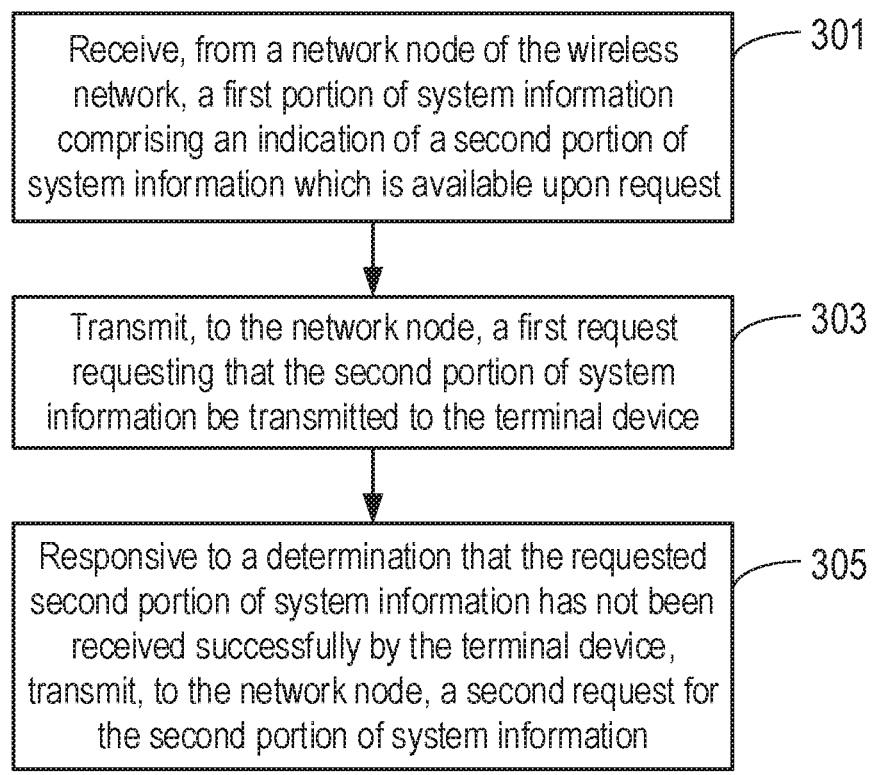
FIGS. 3 to 6 are flowcharts of methods according to embodiments of the disclosure.

FIG. 3 illustrates a method according to embodiments of the disclosure. The method may be carried out in a terminal device, such as the terminal device 16, for example. The terminal device may be operating in an idle or inactive state, such as RRC_IDLE or RRC_INACTIVE. In other words, the terminal device may be operating in a state in which it is not fully connected to the network with dedicated radio resource control signaling.

In step 301 the terminal device receives, from a network node of the wireless network (such as the network node 12), a first portion of system information comprising an indication of a second portion of system information which is available upon request.

The first portion of system information may be minimum system information (SI). The first portion of system information may be periodically broadcast from the network node and received by the terminal device. The minimum SI may comprise basic information required for initial access to the network and may also comprise information for acquiring the second portion of system information, i.e. scheduling information. In some embodiments, the first portion of system information comprises an indication of resources on which the second portion of system information is transmitted. For example the resources on which the second portion of system information is transmitted may comprise an indication of a transmission window in which the second portion of system information is transmitted.

The second portion of system information may comprise any system information not broadcast in the first portion of system information.

In some embodiments the indication of a second portion of system information comprises a list of system information blocks or system information messages belonging to the second portion of system information.

In step 303 the terminal device transmits, to the network node, a first request requesting that the second portion of system information be transmitted to the terminal device.

For example in embodiments where the indication of a second portion of system information comprises a list of system information blocks or system information messages belonging to the second portion of system information, the terminal device may transmit a first request requesting that at least one of the system information blocks or system information messages are transmitted to the terminal device. In some embodiments all of the available system information blocks may be requested.

Step 303 may be performed as part of a random access procedure. For example, in one embodiment the terminal device may send the first request as part of a random access preamble message to the network node (or the random-access preamble message may be interpreted by the network node as a first request). In other embodiments, the terminal device may transmit the first request as part of a radio resource control connection message (i.e. where the terminal device has previously transmitted a random-access preamble message and received a random-access response message from the network node).

In other embodiments the first request may be transmitted separately from the random access procedure.

In step 305 the terminal device, responsive to a determination that the requested second portion of system information has not been received successfully by the terminal device, transmits, to the network node, a second request for the second portion of system information.

In step 305 therefore the terminal device may have identified a problem with the transmitted first request, or in the reception of transmitted second portion of system information. In either case, therefore, the terminal device determines that the requested second portion of the system information has not been received successfully by the terminal device. This determination may be made based on for example, a determination that the first request was not received by the network node, or a determination that the second portion of system information was transmitted by the network node, but was not received by the terminal device.

The terminal device may therefore reinitiate a request for the second portion of system information by transmitting a second request for the second portion of system information. In some embodiment the second request, like the first request, may comprise or be comprised within a random-access preamble message or an RRC connection request message. Those skilled in the art will appreciate that alternative messages may be used to request transmission of the second portion of system information.

Figure 4:
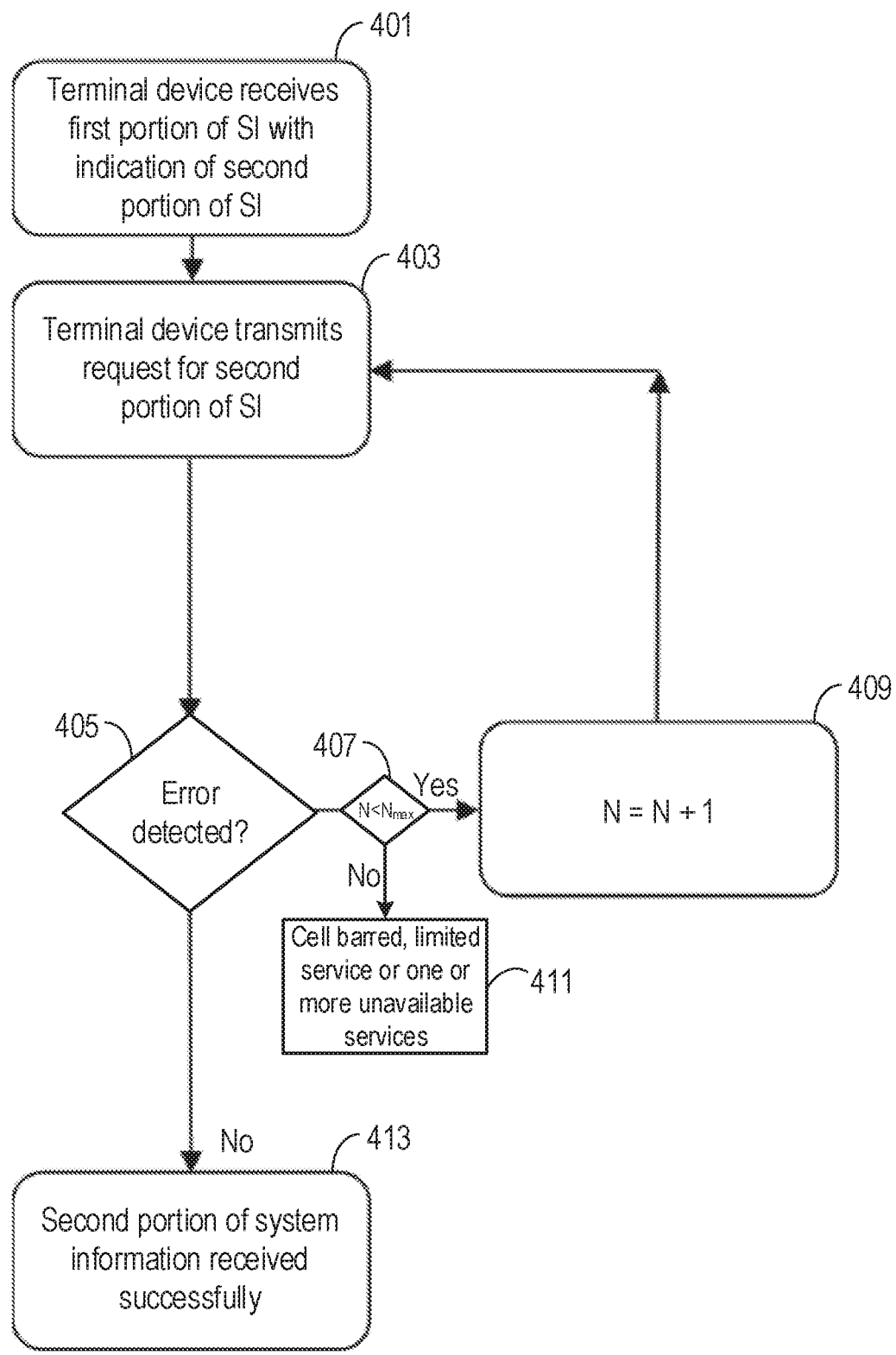

FIG. 4 illustrates a method according to further embodiments of the disclosure. The method may be carried out in a terminal device, such as the terminal device 16. Steps 401 and 403 of FIG. 4 may be substantially similar to steps 301 and 303 of FIG. 3.

In step 401 of FIG. 4 the terminal device receives a first portion of system information comprising an indication of a second portion of system information (SI) which is available on request.

In step 403 the terminal device transmits a request for the second portion of system information.

In step 405 the terminal device listens for the transmission of the second portion of system information (e.g. using scheduling information contained within the first portion of system information), and determines if an error has occurred in the request for the second portion of system information. The determination of an error occurring may occur responsive to a determination that the request second portion of system information has not been received successfully by the terminal device.

The determination that an error has occurred may comprise a number of different possibilities. For example, in some embodiments the terminal device sets a first timer upon transmission of the first request, and determines that the requested second portion of system information has not been received successfully by the terminal device upon expiry of the first timer without receipt of the second portion of system information. It can therefore be determined that there has been an error when the second portion of system information is not received before the first timer expires.

The terminal device may also in addition or alternatively identify that an error has occurred if there is no indication of transmission of the second portion of system information in a subsequent first portion of system information. That is, the first portion of system information may be broadcast periodically by the network node. If the network node has broadcast the second portion of system information (e.g. within a most recent transmission period, or within a recent defined transmission window) it may indicate this in a subsequent broadcast of the first portion of system information. In some examples, the information in the first portion of system information, indicating whether a particular second portion of system information is being periodically broadcast or provisioned upon request, is referred to as "broadcast flag".

The terminal device may also in addition or alternatively identify that an error has occurred if no identifier indicating transmission of the second portion of system information was received by the terminal device during a transmission window. For example the network node may transmit a separate identifier for the terminal device, for example a System information Radio Network Temporary Identifier (SI-RNTI) indicating that the second portion of system information has been transmitted by the network node during the transmission window. Note that the indication may be implicit. For example, the network node may transmit the identifier for the terminal device (such as SI-RNTI) as part of a random-access procedure. In embodiments where the first request is transmitted with a random-access preamble message, receipt of this identifier may indicate that the random-access preamble message (and thus the first request) was received by the network node. If there is no such identifier, then it may be determined that the network node did not receive the transmitted first request.

Similarly, in embodiments where the request for the second portion of system information comprises a random-access preamble, the terminal device may determine that the request was not received by the network node responsive to a determination that a random-access response message has not been received from the network node.

If in step 405 the terminal device determines that no error has occurred, the method passes to step 413 in which the second portion of system information is received successfully.

In some embodiments, the terminal device may be configured with a maximum number of request attempts, i.e. a maximum number of attempts to transmit the request for the second portion of system information. If in step 405 it is determined that an error has occurred, the method passes to step 407 in which the terminal device determines whether a current number of transmission attempts, N, is greater than the maximum value $N_{max}$. The current number of transmission attempts may be determined by maintaining a counter value in the terminal device. If the counter value is not greater than the maximum value $N_{max}$ the method passes to step 409 in which the terminal device increments the counter value, and initiates a further request for the second portion of system information in step 403. In some embodiments, the maximum number of transmission attempts is indicated within the first portion of system information.

Step 409 may further comprise initializing transmission parameters for the further request for the second portion of system information. In some embodiments, the further request (and any subsequent requests) may be transmitted after a delay. For example, the further request for the second portion of system information may not be transmitted until expiry of a second timer. This delay may be used to limit the frequency of subsequent requests.

The second timer may be initiated upon transmission of the first request, and the terminal device transmits the second request for the second portion of system information upon expiry of the second timer. In this embodiment the second timer may be configured with a longer duration than the first timer (used to determine whether the second portion of system information has been received or not).

However, it will be appreciated that other methods of delaying the transmission of the second request may be used. For example, the second timer may be initiated upon expiry of the first timer.

The duration of the second timer may be increased with each transmission of the request or transmission of the second portion of system information.

Thus, for example, if the further (second) request for transmission of the second portion of system information is unsuccessful, the terminal device may transmit a third request for the second portion of system information. In embodiments where the duration of the second timer increases with each subsequent attempt, the time between transmission of the second request and transmission of the third request may be greater than the time between transmission of the first request and transmission of the second request. This provides a back-off mechanism, by which later requests for the second portion of system information are less frequent than earlier requests for the second portion of system information.

In some embodiments, the duration of the second timer is increased linearly between consecutive requests for the second portion of system information.

In other embodiments the duration of the second timer is increased exponentially between consecutive requests for the second portion of system information.

The increase of the duration of the second timer may be either configured by the network using the first portion of system information or configured using dedicated signalling. Alternatively, the duration and increase of the second timer may be provided, or hard coded, in the specifications.

The second request for the second portion of system information may be transmitted using a higher transmit power than the first request for the second portion of system information. A higher transmit power may increase a likelihood that the request will be received by the network node. The transmit power may be increased (ramped) for each subsequent transmission attempt until a maximum transmit power is reached. In such embodiments, the request for transmission of the second portion of system information may comprise a random-access preamble message.

Alternatively, the terminal device may determine that the request was received by the network node, that the second portion of system information was transmitted by the network node, and that the error arose owing to a failure to receive the second portion of system information. For example, as noted above, the presence of a broadcast flag in subsequent transmissions of the first portion of the system information may indicate that the transmitted request was received. The presence of an identifier for the terminal device (such as SI-RNTI) in a transmission by the network node may also indicate that the transmitted request was received. In such embodiments, therefore, subsequent requests for transmission of the second portion of system information may be transmitted at the same transmit power. Subsequent requests for transmission of the second portion of system information may also be transmitted without the back-off mechanism, whereby later requests are transmitted with lower periodicity than earlier requests.

In other words, in some embodiments, the terminal device may continue to transmit requests for the second portion of system information until the second portion of system information is received successfully, until a maximum number of transmission attempts has been reached, or until a maximum transmit power has been reached.

If in step 407 the terminal device determines that the counter value is not less than the maximum value $N_{max}$ the method passes to step 411 in which the cell on which the terminal device is operating (i.e. the cell serviced by the network node) is barred, is deemed to have limited service, or is deemed to have one or more unavailable services. Alternatively, if the maximum transmit power has been reached, the terminal device may similarly deem the cell barred, to have limited service, or to have one or more unavailable services In some embodiments, where the terminal device is in an idle or inactive state, responsive to a determination that reception of the second portion of system information has failed, the terminal device may switch to a connected state (such as RRC_CONNECTED), and acquire the second portion of system information using dedicated signalling from the network node (such as RRC signalling). The terminal device may switch to the connected state upon reaching the maximum number of transmission attempts, or the maximum transmit power, for example, Optionally, the terminal device may switch to the connected state before the maximum number of transmission attempts has been reached. For example, it may be beneficial for the terminal device to switch to the connected state if the terminal device can determine that the second portion of system information was transmitted by the network node, and possibly even partially read by the terminal device (e.g. to read the PDCCH/SI-RNTI), but not decoded in full by the terminal device.

Figure 5:
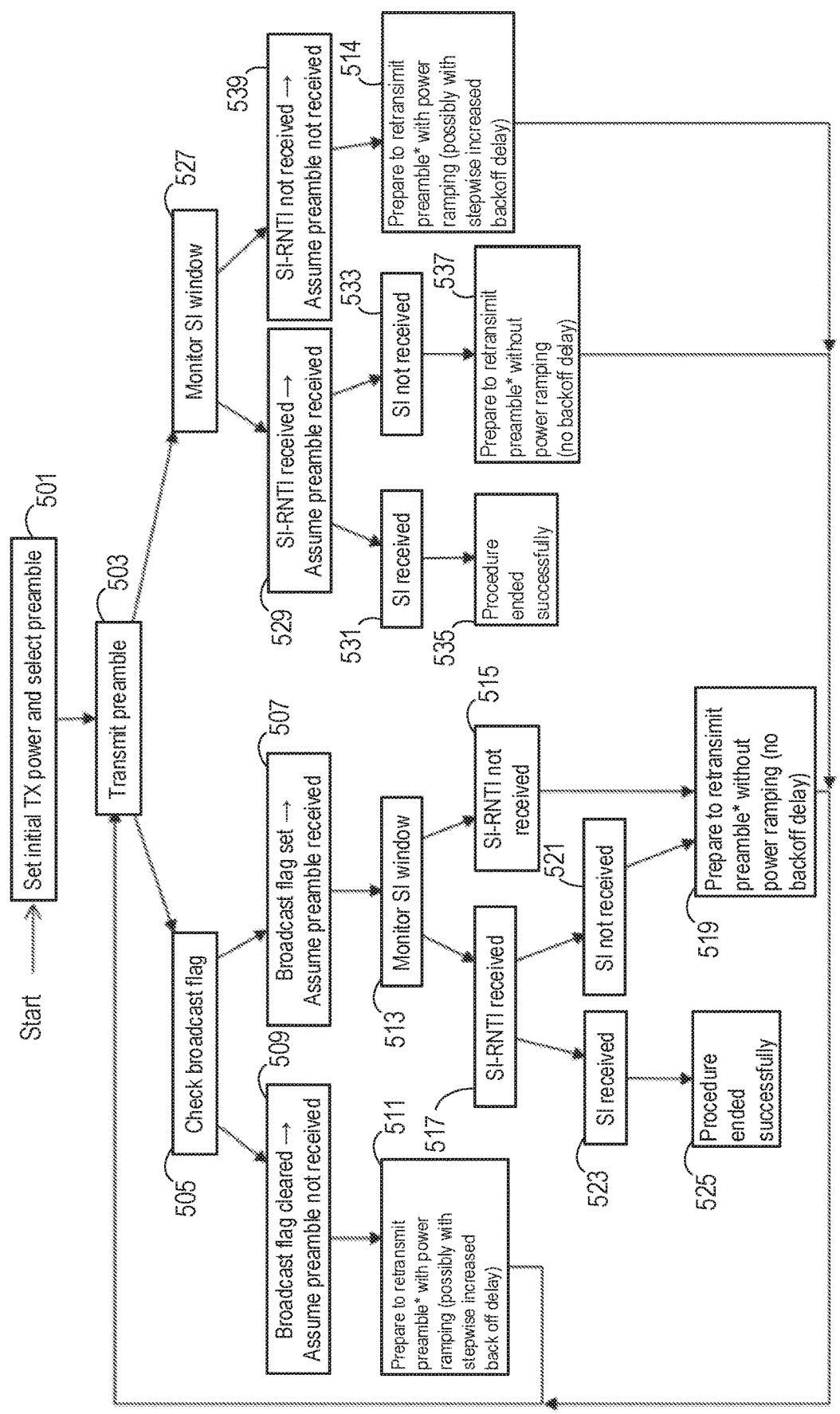

FIG. 5 illustrates a flow chart of a random access procedure according to embodiments of the disclosure, where the request for the second portion of system information is transmitted with a random access preamble message. The method may be carried out in a terminal device.

In step 501 the method comprises setting an initial transmission power and selecting a random-access preamble from the plurality of preambles available to the terminal device. In some embodiments the preamble may be selected from a subset of preambles which are understood by the network node to indicate a request for transmission of a second portion of system information. Alternatively, the preamble may be configured for transmission using a defined instance (e.g. defined resources, such as a frequency and time slot, mini slot or sub-frame) which is understood by the network node to indicate that the transmitted preamble is a request for transmission of a second portion of system information. The request may specify all of the second portion of system information, or only part of it (e.g. particular system information blocks or signals).

In step 503 the terminal device transmits the random-access preamble message to a network node. In one embodiment, the method then passes to step 505. In another embodiment, the method passes to step 527. In further embodiments, steps 505 and 527, and their respective subsequent steps, may be performed in parallel.

In step 505 the terminal device checks subsequent transmissions of the first portion of system information to determine if a broadcast flag is present, or set. As previously described, the minimum system information may be broadcast periodically and therefore, if the network node has broadcast the second portion of system information, it may indicate this in a subsequent broadcast of the minimum system information.

If no broadcast flag is found in the first portion of system information, the method passes to step 509 in which the terminal device assumes that the random-access preamble message was not received by the network node. The method then passes to step 511 in which the terminal device prepares to retransmit the preamble message. In some embodiments, the retransmission may use power ramping to transmit subsequent preamble messages at a higher transmit power, as one possible reason for this error is too low a transmission power at the terminal device side. In some embodiments the preamble may be retransmitted with back-off delay as described with respect to FIG. 4.

In all cases, the retransmitted random-access preamble message may use the same preamble, or a new, randomly selected preamble. Where a subset of available preambles is configured to indicate that the random-access preamble message is a request for transmission of the second portion of system information, the same preamble may be used for retransmissions.

Similarly, if the preamble specifies particular parts of the second portion of system information, then the same preamble will be transmitted as the method passes back to step 503 from step 511. However, if the preamble does not specify the requested system information then a new preamble may be selected randomly.

If at step 505 the terminal device determines that the broadcast flag is present, the method passes to step 507 in which the terminal device assumes that the preamble was received by the network node. The method then passes to step 513 in which the terminal device monitors the system information transmission window, i.e. resources on which the second portion of system information is to be transmitted.

In step 513 the terminal device monitors the system information transmission window to determine if an identifier indicating transmission of the second portion of system information is received by the terminal device during the transmission window. The identifier may be a System information Radio Network Temporary Identifier (SI-RNTI) indicating that the second portion of system information has been transmitted by the network node during the transmission window.

If the SI-RNTI is not received by the terminal device in step 515, the method passes to step 519 in which the terminal device prepares to retransmit the preamble, and the method proceeds to step 503. In other words, if the SI-RNTI is not received by the terminal device in step 515, the method passes to step 519 in which the terminal device proceeds to step 503. As in this case it is clear that the preamble was received by the network node (as the first portion of system information comprised a broadcast flag), there is no benefit to increasing the power of the preamble transmission so no power ramping need be applied. One possible reason for this error is too low a transmission power in the network side If the SI-RNTI is received during the transmission window in step 517, the method determines whether or not the second portion of system information is actually received by the terminal device. In some embodiments, this may rely on the system information being received before the expiry of a first timer, as described with reference to FIG. 4, or may rely upon successful decoding of the second portion of system information.

If the second portion of system information is received in step 523, the procedure ends successfully in step 525. If, however, the second portion of system information is not received, in step 521, the method passes to step 519.

In step 527, the terminal device monitors the system information transmission window to determine if an identifier indicating transmission of the second portion of system information is received by the terminal device during the transmission window. The identifier may be a System information Radio Network Temporary Identifier (SI-RNTI) indicating that the second portion of system information has been transmitted by the network node during the transmission window.

If the SI-RNTI is not received by the terminal device in step 539 the terminal device assumes that the preamble was not received by the network node. The method then passes to step 541 in which the terminal device prepares to retransmit the preamble. As in this case it is not clear that the preamble was received by the network node (as the broadcast flag was not monitored), there may be benefit to increasing the power of the preamble transmission so power ramping may be applied in subsequent re-transmissions of random-access preamble messages.

If the SI-RNTI is received during the transmission window in step 529 the terminal device assumes that the preamble was received by the network node. The method then determines whether or not the second portion of system information is actually received by the terminal device. In some embodiments, this may rely on the system information being received before the expiry of a first timer, as described with reference to FIG. 4, or may rely upon successful decoding of the second portion of system information.

If the second portion of system information is received in step 531, the procedure ends successfully in step 535. If, however, the second portion of system information is not received, in step 533, the method passes to step 537 in which the terminal device prepares to retransmit the preamble. In other words, if the second portion of system information is not received, in step 533, the method passes to step 537 in which the terminal device proceeds to retransmit the preamble in step 503. As in this case it is clear that the preamble was received by the network node as the SI-RNTI was received, there is no benefit to increasing the power of the preamble transmission so no power ramping need be applied. One possible reason for this error is too low a transmission power in the network side.

Figure 6:
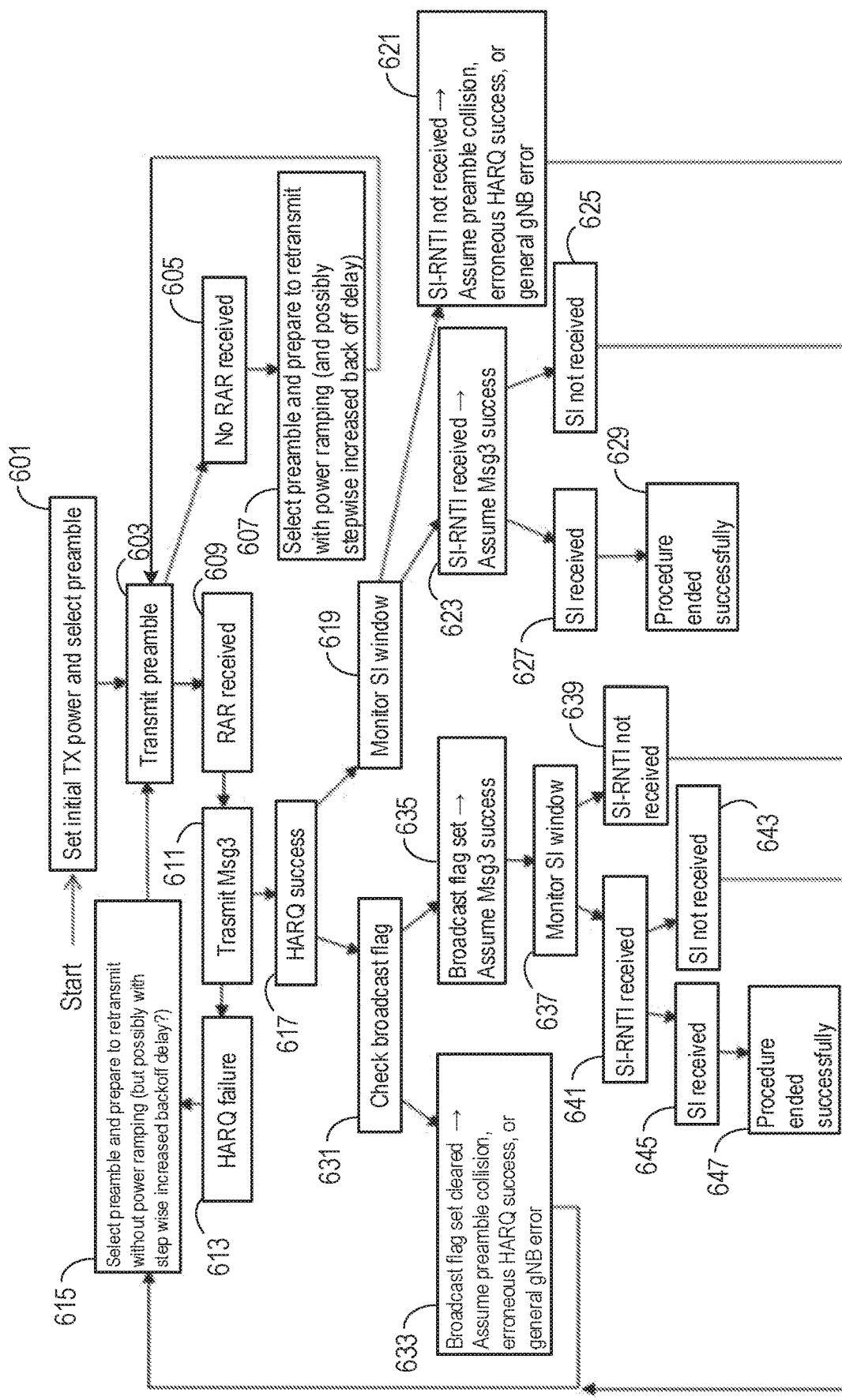

FIG. 6 illustrates a flowchart of a random access procedure according to further embodiments of the disclosure, where the request for the second portion of system information is transmitted as part of a radio resource control connection message. The method may be carried out in a terminal device.

In step 601 the method comprises setting an initial transmission power and selecting a random-access preamble. The selection may be random, from a plurality of preambles available to the terminal device.

In step 603 the terminal device transmits the random-access preamble to a network node. If no Random Access Response (RAR) is received at the terminal device in step 605, the method passes to step 607 in which the terminal device reselects a preamble to transmit. In some embodiments power ramping is applied for the transmission of a second preamble, as one possible reason for this error is too low a transmission power in the terminal device side.

The method then passes back to step 603 and the selected preamble is transmitted.

If in step 609 a RAR is received the method passes to step 611 in which a radio resource control connection message is transmitted to the network node. The radio resource control message is referred to as Msg3.

If the Msg3 is not received successfully a Hybrid automatic repeat request (HARQ) failure may occur in step 613. That is, the network node should transmit an acknowledgement message (ACK) to the terminal device, acknowledging successful receipt of Msg3. If no acknowledgment message is received, or if a negative acknowledgement message (HACK) is received, the method may proceed to step 613. The method will then move to step 615 in which the terminal device reselects a preamble to transmit. In this case, the terminal device may not apply power ramping because, as the preamble was received by the network node, it is clear that the power applied by the terminal device is sufficient. In some embodiments, some increase back-off delay may be applied by the terminal device as described with reference to FIG. 4.

If the Msg3 is received successfully, a HARQ success will occur at step 617. The method then passes to either step 619 or step 631. In other words, if Msg3 is received successfully the method proceeds to either step 619 or step 631. However, in some embodiments steps 619 and 631, and their respective subsequent steps, may be performed in parallel.

In step 631 the terminal device checks subsequent transmissions of the first portion of system information to determine if a broadcast flag is present, or set. As previously described, the minimum system information may be broadcast periodically and therefore, if the network node has broadcast the second portion of system information it may indicate this in a subsequent broadcast of the minimum system information.

If no broadcast flag is found in the first portion of system information, the method passes to step 633 in which the terminal device assumes, for example, that a preamble collision in an erroneous HARQ success has occurred. In other words, if no broadcast flag is found in the first portion of system information, the method proceeds to step 615. Alternatively the error may be due to some general error within the network node. The method then passes to step 615 in which the terminal device prepares to retransmit another preamble message. In other words, if no broadcast flag is found in the first portion of system information the method proceeds to step 603 in which the terminal device retransmits another preamble message.

If at step 631 the terminal device determines that an indication of transmission of the second portion of system information, or broadcast flag, is present in a subsequent first portion of system information, the method passes to step 635 in which the terminal device assumes that the Msg3 was received by the network node. The method then passes to step 637 in which the terminal device monitors the system information transmission window.

In step 637 the terminal device monitors the system information transmission window to determine if an identifier indicating transmission of the second portion of system information is received by the terminal device during the transmission window. The identifier may be a System information Radio Network Temporary Identifier (SI-RNTI) indicating that the second portion of system information has been transmitted by the network node during the transmission window.

If the SI-RNTI is not received by the terminal device in step 639, the method passes to step 615 in which the terminal device prepares to retransmit the preamble. In other words, if the SI-RNTI is not received by the terminal device in step 639, the method passes to step 615 in which the terminal device proceeds to retransmit the preamble in step 603. As in this case it is clear that the preamble was received by the network node as the broadcast flag was received, there is no benefit to increasing the power of the preamble transmission so no power ramping need be applied. One possible reason for this error is too low a transmission power in the network side If the SI-RNTI is received during the transmission window in step 641, the method determines whether or not the second portion of system information is actually received by the terminal device. In some embodiments, this may rely on the second portion of system information being received before the expiry of a first timer, as described with reference to FIG. 4, or rely on successful decoding of the second portion of system information.

If the second portion of system information is received in step 645, the procedure ends successfully in step 647. If, however, the second portion of system information is not received, in step 643, the method passes to step 615.

In step 619, the terminal device monitors the system information transmission window to determine if an identifier indicating transmission of the second portion of system information is received by the terminal device during the transmission window. The identifier may be a System information Radio Network Temporary Identifier (SI-RNTI) indicating that the second portion of system information has been transmitted by the network node during the transmission window.

If the SI-RNTI is not received by the terminal device in step 621 the terminal device assumes a preamble collision or an erroneous HARQ success occurred. Alternatively the error may be due to some general error within the network node. The method then passes to step 615 in which the terminal device prepares to retransmit the preamble. In other words, if the SI-RNTI is not received by the terminal device in step 621 the method passes to step 615 in which the terminal device proceeds to retransmit the preamble in step 603.

If the SI-RNTI is received during the transmission window in step 623 the terminal device assumes that the Msg3 was received by the network node. The method then determines whether or not the second portion of system information is actually received by the terminal device. In some embodiments, this may rely on the system information being received before the expiry of a first timer, as described with reference to FIG. 4, or rely upon successful decoding of the second portion of system information.

If the second portion of system information is received in step 627, the procedure ends successfully in step 629. If, however, the second portion of system information is not received, in step 625, the method passes to step 615 in which the terminal device in which the terminal device prepares to retransmit the preamble. As in this case it is clear that the preamble was received by the network node as the SI-RNTI was received, there is no benefit to increasing the power of the preamble transmission so no power ramping need be applied. One possible reason for this error is too low a transmission power in the network side.

The embodiments described above may be combined to provide further embodiments. For example, as mentioned above, there may be a (possibly configurable) maximum number of request attempts, $N_{max}$, (e.g. preamble retransmissions), until the terminal device determines that the request has failed. Similarly, in power ramping embodiments, the terminal device may reach a maximum transmit power. In either case, at this point, the terminal device may consider the cell on which it is operating as one of barred; accessible but with limited service; accessible (unbarred) but with the related service as unavailable (in the cell).

Figure 7:
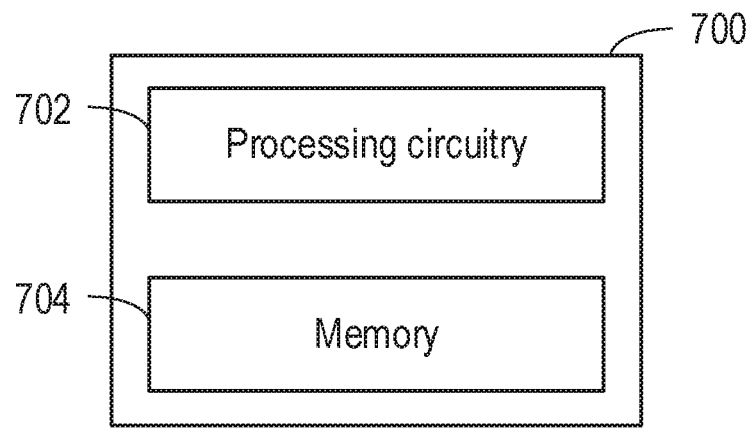
FIG. 7 is a schematic drawing of a terminal device according to embodiments of the disclosure.

FIG. 7 is a schematic diagram of a terminal device 700 according to embodiments of the disclosure. For example, the terminal device 700 may correspond to the terminal device 16 described above. The terminal device 700 may be suitable for performing the method described above with respect to any of FIGS. 3-6.

The terminal device 700 comprises processing circuitry 702 and a non-transitory machine-readable medium 704 storing instructions which, when executed by the processing circuitry 702, cause the terminal device to: receive, from a network node of the wireless network, a first portion of system information comprising an indication of a second portion of system information which is available upon request; transmit, to the network node, a first request requesting that the second portion of system information be transmitted to the terminal device; and responsive to a determination that the requested second portion of system information has not been received successfully by the terminal device, transmit, to the network node, a second request for the second portion of system information.

The terminal device 700 may also generally comprise hardware and/or software for transmitting and receiving wireless signals, such as one or more antennas, and transceiver circuitry coupled to the one or more antennas, such that the receiving and transmitting operations described above, while controlled by processing circuitry 702, utilize the transceiver circuitry.

Figure 8:
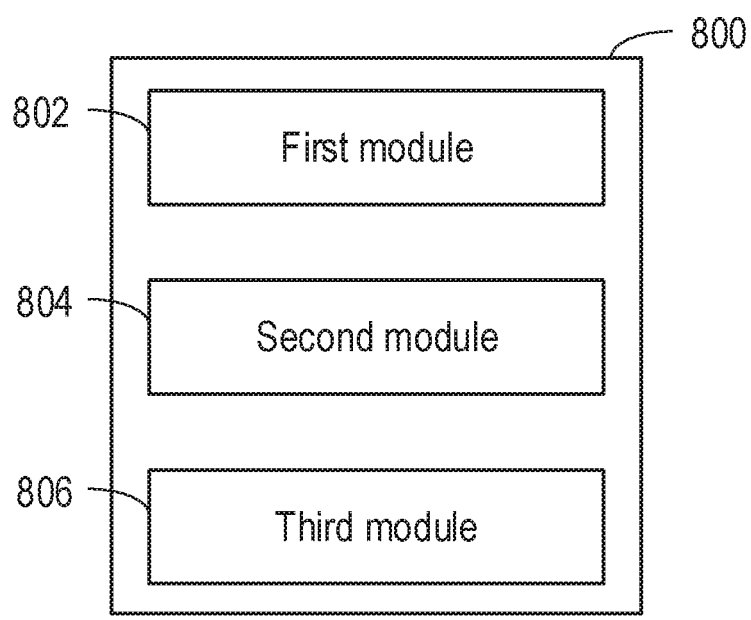
FIG. 8 is a schematic drawing of a terminal device according to further embodiments of the disclosure.

FIG. 8 is a schematic diagram of a terminal device 800 according to further embodiments of the disclosure. For example, the terminal device 800 may correspond to the terminal device 16 described above. The terminal device 800 may be suitable for performing the method described above with respect to any of FIGS. 3-6.

The terminal device 800 comprises a first module 802, a second module 804 and a third module 806. The first module 802 is configured to receive, from a network node of the wireless network, a first portion of system information comprising an indication of a second portion of system information which is available upon request. The second module 804 is configured to transmit, to the network node, a first request requesting that the second portion of system information be transmitted to the terminal device. The third module 806 is configured to, responsive to a determination that the requested second portion of system information has not been received successfully by the terminal device, transmit, to the network node, a second request for the second portion of system information.

The terminal device 800 may also generally comprise hardware and/or modules for transmitting and receiving wireless signals, such as one or more antennas, and transceiver modules coupled to the one or more antennas.

The disclosure thus provides methods and apparatus in a wireless communication network for requesting and receiving system information, and particularly for identifying and recovering from errors in the reception of system information.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The following numbered statements set out embodiments of the disclosure:

1. A method of requesting system information in a terminal device for a wireless network, the method comprising:
   receiving, from a network node of the wireless network, a first portion of system information comprising an indication of a second portion of system information which is available upon request;
   transmitting, to the network node, a first request requesting that the second portion of system information be transmitted to the terminal device; and
   responsive to a determination that the requested second portion of system information has not been received successfully by the terminal device, transmitting, to the network node, a second request for the second portion of system information.

2. A method as in paragraph 1 wherein the terminal device is operating in an idle or inactive state.

3. A method as in paragraph 1 or 2 wherein the indication of a second portion of system information comprises a list of system information blocks or system information messages belonging to the second portion of system information.

4. A method as in any preceding paragraph wherein the first portion of system information further comprises an indication of resources on which the second portion of system information is transmitted.

5. A method as in paragraph 4 wherein the resources comprise an indication of a transmission window in which the second portion of system information is transmitted.

6. A method as in any preceding paragraph, wherein the first portion of the system information is broadcast periodically by the network node.

7. A method as in any preceding paragraph further comprising:
   setting a first timer upon transmission of the first request, and
   determining that the requested second portion of system information has not been received successfully by the terminal device upon expiry of the first timer without receipt of the second portion of system information.

8. A method as in any preceding paragraph further comprising
   setting a second timer upon transmission of the first request; and
   transmitting the second request for the second portion of system information upon expiry of the second timer.

9, A method as in any preceding paragraph further comprising, responsive to a determination that the requested second portion of system information has not been received successfully by the terminal device,
   transmitting, to the network node, a third request for the second portion of system information.

10. A method as in paragraph 9 when dependent on paragraph 8 wherein a duration of the second timer is increased for the third and subsequent requests for the second portion of system information.

11. A method as in paragraph 10 wherein the duration of the second timer is increased linearly between consecutive requests for the second portion of system information.

12. A method as in paragraph 10 wherein the length of the second timer is increased exponentially between consecutive requests for the second portion of system information.

13. A method as in any one of paragraphs 10 to 12 wherein a duration of the second timer is provided in the first portion of system information.

14. A method as in any one of paragraphs 9 to 13, further comprising,
   responsive to a determination that a total number of requests has reached or exceeded a maximum number;
   determining that a cell associated with the network node is barred, has limited service, or has one or more unavailable services.

15. A method as in paragraph 14 wherein the first portion of system information comprises an indication of the maximum number.

16. A method as in any preceding paragraph, further comprising;
   responsive to a determination that reception of the second portion of system information has failed, switching to a connected state and acquiring the second portion of system information using dedicated signalling from the network node.

17. A method as in any preceding paragraph wherein the determination that the requested second portion of system information has not been received successfully by the terminal device comprises determining that the first request was not received by the network node.

18. A method as in paragraph 17 wherein,
   the first portion of system information is transmitted periodically, and wherein the step of determining that the first request was not received by the network node comprises determining that there is no indication of transmission of the second portion of system information in a subsequent first portion of system information.

19. A method as in paragraph 17 wherein the step of determining that the first request was not received by the network node comprises determining that no identifier indicating transmission of the second portion of system information was received by the terminal device during a transmission window.

20. A method as in any one of paragraphs 1 to 16 wherein the determination that the requested second portion of system information has not been received successfully by the terminal device comprises determining that the second portion of system information was not received by the terminal device.

21. A method as in paragraph 20 wherein,
the first portion of system information is transmitted periodically, and wherein the step of determining that the second portion of system information was not received by the terminal device comprises determining that a subsequent first portion of system information comprises an indication of transmission of the second portion of system information.

22. A method as in paragraph 20 wherein determining that the second portion of system information was not received by the terminal device comprises determining that an identifier indicating transmission of the second portion of system information was received by the terminal device during a transmission window.

23. A method as in any preceding paragraph wherein the first request comprises a random access preamble message.

24. A method as in paragraph 23 when dependent on any one of paragraphs 17 to 19, wherein the second request is transmitted with higher transmit power than the first request.

25. A method as in any one of paragraphs 1 to 22 wherein the first request is transmitted as part of a radio resource control connection message.

26. A terminal device for a wireless network, the terminal device configured to carry out a method as described in any one of paragraphs 1 to 25.

27. A terminal device for requesting system information, the terminal device comprising:
processing circuitry and a machine-readable medium storing instructions which, when executed by the processing circuitry, cause the terminal device to:
receive, from a network node of the wireless network, a first portion of system information comprising an indication of a second portion of system information which is available upon request;
transmit, to the network node, a first request requesting that the second portion of system information be transmitted to the terminal device; and
responsive to a determination that the requested second portion of system information has not been received successfully by the terminal device, transmit, to the network node, a second request for the second portion of system information.

28. A terminal device as in paragraph 27 wherein the terminal device is operative in an idle or inactive state.

29. A terminal device as in paragraph 27 or 28 wherein the indication of a second portion of system information comprises a list of system information blocks or system information messages belonging to the second portion of system information.

30. A terminal device as in any one of paragraphs 27 to 29 wherein the first portion of system information further comprises an indication of resources on which the second portion of system information is transmitted.

31. A terminal device as in paragraph 30 wherein the resources comprise an indication of a transmission window in which the second portion of system information is transmitted.

32. A terminal device as in any one of paragraphs 27 to 31, wherein the first portion of the system information is broadcast periodically by the network node.

33. A terminal device as in any one of paragraphs 27 to 32 wherein the terminal device is operable to:
set a first timer upon transmission of the first request, and
determine that the requested second portion of system information has not been received successfully by the terminal device upon expiry of the first timer without receipt of the second portion of system information.

34. A terminal device as in any one of paragraphs 27 to 33 wherein the terminal device is operable to:
set a second timer upon transmission of the first request, and
transmit the second request for the second portion of system information upon expiry of the second timer.

35. A terminal device as in any one of paragraphs 27 to 34 wherein the terminal device is operable to:
responsive to a determination that the requested second portion of system information has not been received successfully by the terminal device, transmit, to the network node, a third request for the second portion of system information.

36. A terminal device as in paragraph 35 when dependent on paragraph 34 wherein a duration of the second timer is increased for the third and subsequent requests for the second portion of system information.

37. A terminal device as in paragraph 36 wherein the duration of the second timer is increased linearly between consecutive requests for the second portion of system information.

38. A terminal device as in paragraph 36 wherein the length of the second timer is increased exponentially between consecutive requests for the second portion of system information 39. A terminal device as in any one of paragraphs 36 to 38 wherein a duration of the second timer is provided in the first portion of system information.

40. A terminal device as in any one of paragraphs 35 to 39, wherein the terminal device is operable to:
responsive to a determination that a total number of requests has reached or exceeded a maximum number; determine that a cell associated with the network node is barred, has limited service, or has one or more unavailable services.

41. A terminal device as in paragraph 40 wherein the first portion of system information comprises an indication of the maximum number.

42. A terminal device as in any one of paragraphs 27 to 41, wherein the terminal device is further operable to:
responsive to a determination that reception of the second portion of system information has failed, switch to a connected state and acquire the second portion of system information using dedicated signalling from the network node.

43. A terminal device as in any one of paragraphs 27 to 42 wherein the terminal device is operable to determine that the requested second portion of system information has not been received successfully by the terminal device by determining that the first request was not received by the network node.

44. A terminal device as in paragraph 43 wherein,
the first portion of system information is transmitted periodically, and wherein wherein the terminal device is operable to:
determine that the first request was not received by the network node by determining that there is no indication of transmission of the second portion of system information in a subsequent first portion of system information.

45. A terminal device as in paragraph 43 wherein the terminal device is further operable to:
determine that the first request was not received by the network node by determining that no identifier indicating transmission of the second portion of system information was received by the terminal device during a transmission window.

46. A terminal device as in any one of paragraphs 27 to 42 wherein the terminal device is further operable to:
determine that the requested second portion of system information has not been received successfully by the terminal device by determining that the second portion of system information was not received by the terminal device.

47. A terminal device as in paragraph 46 wherein,
the first portion of system information is transmitted periodically, and wherein the terminal device is further operable to:
determine that the second portion of system information was not received by the terminal device by determining that there is an indication of transmission of the second portion of system information in a subsequent first portion of system information.

48. A terminal device as in paragraph 46 wherein the terminal device is further operable to:
determine that the second portion of system information was not received by the terminal device by determining that an identifier indicating transmission of the second portion of system information was received by the terminal device during a transmission window.

49. A terminal device as in as in any one of paragraphs 27 to 48 wherein the first request comprises a random access preamble message.

50. A terminal device as in paragraph 49 when dependent on any one of paragraphs 43 to 45, wherein the second request is transmitted with higher transmit power than the first request.

51. A terminal device as in any one of paragraphs 27 to 48 wherein the first request is transmitted as part of a radio resource control connection message.

52. A terminal device for a wireless network, for requesting system information, the terminal device comprising:
a first module configured to receive, from a network node of the wireless network, a first portion of system information comprising an indication of a second portion of system information which is available upon request;
a second module configured to transmit, to the network node, a first request requesting that the second portion of system information be transmitted to the terminal device; and
a third module configured to, responsive to a determination that the requested second portion of system information has not been received successfully by the terminal device, transmit, to the network node, a second request for the second portion of system information.

The invention claimed is:

1. A method of requesting system information in a user equipment for a wireless network, the method comprising:
receiving, from a base station of the wireless network, a first portion of system information, the first portion comprising an indication of a second portion of system information which is available upon request;
transmitting, to the base station, a first request requesting that the second portion of the system information be transmitted to the user equipment;
checking information received in subsequent transmissions of the first portion of the system information from the base station;
determining, based on the checking of the information received in the subsequent transmissions, whether an error has occurred in the first request for the second portion of the system information,
wherein the user equipment is operating in an idle state or an inactive state, and
wherein the error occurring in the first request for the second portion of the system information is determined when a broadcast flag is absent in the checked information;
determining that the requested second portion of the system information has not been received successfully by the user equipment based on the determined error;
transmitting, to the base station, a second request for the second portion of the system information based on the determination that the requested second portion is not successfully received in the idle state or the inactive state; and
switching from the idle state or the inactive state to a connected state of the terminal device based on a failure of reception of the requested second portion of the system information in response to the second request, wherein the switching is performed when the second request corresponds to a reached state of a maximum number of transmission attempts.

2. The method of claim 1, wherein the first portion of the system information further comprises an indication of resources on which the second portion of the system information is transmitted.

3. The method of claim 2, wherein the indication of the resources comprises an indication of a transmission window in which the second portion of the system information is transmitted.

4. The method of claim 1, wherein the first portion of the system information is broadcast periodically by the base station.

5. The method of claim 1, wherein duration of a first timer is provided in the first portion of the system information.

6. The method of claim 1, further comprising, responsive to the determination that the requested second portion of the system information has not been received successfully by the user equipment, transmitting, to the base station, a third request for the second portion of the system information.

7. The method of claim 6, further comprising,
responsive to a determination that a total number of requests has reached or exceeded the maximum number of transmission attempts;
determining that a cell associated with the base station is barred, has limited service, or has one or more unavailable services.

8. The method of claim 7, wherein the first portion of the system information comprises an indication of the maximum number.

9. The method of claim 1, wherein the first request comprises a random access preamble message.

10. The method of claim 1, wherein the first request is transmitted as part of a radio resource control connection message.

11. The method of claim 10, further comprising:
responsive to receiving an acknowledgment message to the radio resource control connection message, determining that the radio resource control connection message has been received by the base station.

12. The method of claim 1, wherein the indication of the second portion of the system information comprises a list of system information blocks or system information messages belonging to the second portion of the system information.

13. The method of claim 1, further comprising:
setting a first timer and a second timer upon the transmission of the first request;
determining that the requested second portion of the system information has not been received successfully by the user equipment upon expiry of the first timer without receipt of the second portion the system information; and
transmitting the second request for the second portion of the system information upon expiry of the second timer, wherein the second timer is configured with a longer duration than the first timer,
wherein when a duration of the second timer increases with each subsequent attempt of transmission of request for the second portion of the system information, a time between transmission of the second request and a third request is greater than a time between transmission of the first request and the second request, which provides a back-off mechanism, by which later requests for the second portion of the system information are less frequent than earlier requests for the second portion of the system information.

14. A user equipment for requesting system information, the user equipment comprising:
processing circuitry and a machine-readable medium storing instructions that, when executed by the processing circuitry, cause the user equipment to:
receive, from a base station of a wireless network, a first portion of system information, the first portion comprising an indication of a second portion of system information which is available upon request;
transmit, to the base station, a first request requesting that the second portion of the system information be transmitted to the user equipment;
check information received in subsequent transmissions of the first portion of the system information from the base station;
determine, based on the checking of the information received in the subsequent transmissions, whether an error has occurred in the first request for the second portion of the system information,
wherein the user equipment is operating in an idle state or an inactive state, and
wherein the error occurring in the first request for the second portion of the system information is determined when a broadcast flag is absent in the checked information;
determine that the requested second portion of the system information has not been received successfully by the user equipment based on the determined error;
transmit, to the base station, a second request for the second portion of the system information based on the determination that the requested second portion is not successfully received in the idle state or the inactive state; and
switch from the idle state or the inactive state to a connected state of the terminal device based on a failure of reception of the requested second portion of the system information in response to the second request, wherein the switching is performed when the second request corresponds to a reached state of a maximum number of transmission attempts.

15. The user equipment of claim 14, wherein the first portion of the system information further comprises an indication of resources on which the second portion of the system information is transmitted.

16. The user equipment of claim 15, wherein the indication of the resources comprises an indication of a transmission window in which the second portion of the system information is transmitted.

17. The user equipment of claim 14, wherein the first portion of the system information is broadcast periodically by the base station.

18. The user equipment of claim 14, wherein the user equipment is operable to:
responsive to the determination that the requested second portion of the system information has not been received successfully by the user equipment, transmit, to the base station, a third request for the second portion of the system information.

19. The user equipment of claim 18, wherein the user equipment is operable to:
responsive to a determination that a total number of requests has reached or exceeded maximum number of transmission attempts, determine that a cell associated with the base station is barred, has limited service, or has one or more unavailable services.

20. The user equipment of claim 19, wherein the first portion of the system information comprises an indication of the maximum number.

21. The user equipment of claim 14, wherein the first request is transmitted as part of a radio resource control connection message.

22. The user equipment of claim 21, wherein the user equipment is operable to, responsive to receiving an acknowledgment message to the radio resource control connection message, determine that the radio resource control connection message has been received by the base station.

23. The user equipment of claim 14, wherein the indication of the second portion of the system information comprises a list of system information blocks or system information messages belonging to the second portion of the system information.

24. The user equipment of claim 14, wherein the user equipment is operable to:
set a first timer and a second timer upon transmission of the first request;
determine that the requested second portion of the system information has not been received successfully by the user equipment upon expiry of the first timer without receipt of the second portion of system information; and
transmit the second request for the second portion of the system information upon expiry of the second timer, wherein the second timer is configured with a longer duration than the first timer,
wherein when a duration of the second timer increases with each subsequent attempt of transmission of request for the second portion of the system information, a time between transmission of the second request and a third request is greater than a time between the transmission of the first request and the second request, which provides a back-off mechanism, by which later requests for the second portion of the system information are less frequent than earlier requests for the second portion of the system information.

\* \* \* \* \*